(12) United States Patent
Minemier

(10) Patent No.: US 6,614,562 B1
(45) Date of Patent: Sep. 2, 2003

(54) REDUCING DARK CURRENT NOISE IN AN IMAGING SYSTEM

(75) Inventor: Ronald K. Minemier, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/343,390

(22) Filed: Jun. 30, 1999

(51) Int. Cl.[7] ................................. H04N 1/04
(52) U.S. Cl. ...................... 358/483; 358/482
(58) Field of Search ................ 358/483, 482, 358/474, 475, 1.9, 509, 504, 520; 250/201.2, 201.8

(56) References Cited

U.S. PATENT DOCUMENTS

| | | | | |
|---|---|---|---|---|
| 4,194,220 A | * | 3/1980 | Frame | 358/221 |
| 4,551,762 A | * | 11/1985 | Levine | 358/221 |
| 4,785,353 A | * | 11/1988 | Seim | 358/213.26 |
| 5,086,343 A | * | 2/1992 | Cook et al. | 358/213.15 |
| 5,113,246 A | * | 5/1992 | Ninomiya | 358/44 |
| 5,508,740 A | * | 4/1996 | Miyaguchi | 348/244 |
| 5,604,781 A | * | 2/1997 | Suzuki | 378/62 |
| 5,880,777 A | * | 3/1999 | Savoye | 348/217 |
| 6,160,282 A | * | 12/2000 | Merrill | 257/292 |
| 6,184,511 B1 | * | 2/2001 | Yamashita | 250/201.2 |
| 6,188,093 B1 | * | 2/2001 | Isogai | 257/230 |

* cited by examiner

*Primary Examiner*—Jerome Grant, II
*Assistant Examiner*—Negussie Worku
(74) *Attorney, Agent, or Firm*—Trop, Pruner & Hu, P.C.

(57) ABSTRACT

Dark current noise may be compensated for in a digital imaging sensor by measuring the temperature of a silicon diode embedded on the same integrated circuit with the image sensor. This information may be used together with initial dark current calibration information, to provide dark current compensation on the fly during image capture. In some embodiments this may avoid the need for multiple shutter operations or repeatedly capturing a dark frame and then capturing a regular image frame.

30 Claims, 4 Drawing Sheets

REDUCING DARK CURRENT NOISE IN AN IMAGING SYSTEM

BACKGROUND

The invention relates to reducing dark current noise during image capture operations in a digital imaging system.

Referring to FIG. 1, a common digital image processing system includes a camera 100, a computer 102 coupled to the camera 100 by a communication link 104, and a display unit 106. The communication link 104 may be a serial bus such as the universal serial bus (USB). The display unit 106 may be any convenient display device such as a cathode ray tube (CRT) or liquid crystal display (LCD).

The camera 100 may use the imager 108 to generate an electrical representation of an optical image 110. To accomplish this, the imager 108 may include a sensor having an array of photon sensing elements. During an integration time or interval, each sensor element accumulates light energy from that portion of optical image 110 that is focused on it by camera 100 optics (not shown in FIG. 1). At the expiration of the integration interval, sensor elements indicate the intensity of the received light energy by, for example, an analog voltage signal. Camera 100 typically processes the indications from sensor elements to form a frame of digital data which may then be stored in memory internal to the camera 100 (not shown in FIG. 1), and/or transferred to the computer 102.

Typically, the frame of data does not indicate an exact duplicate of the optical image 110 due to imperfections introduced by camera 100. The camera 100 may introduce optical distortion and noise such as dark current noise. Dark current noise may be defined as sensor element current that is present even when the sensor element is not illuminated. Dark current noise tends to reduce the captured image's dynamic range and signal to noise ratio (SNR) and places a limit on sensor element integration time. Dark current noise also tends to increase as the temperature increases, rendering many cameras substantially unusable in high temperature environments.

Some cameras attempt to cancel out dark current noise by subtracting a predetermined noise level from the intensity that is indicated by the sensor element. The predetermined noise level may be determined from, for example, an extra sensor element that is not exposed to light during image capture operations. Similarly, some cameras attempt to compensate for offset noise by subtracting a predetermined value from an analog to digital converter output.

With conventional dark current compensation schemes, a full frame exposure in the dark condition is normally used to provide for dark current compensation. This increases the capture time thereby resulting in slower back-to-back captures. Allowing for dark frame capture may also result in an additional shutter opening and closing cycle. Extra opening and closing cycles increase battery power consumption in some situations. In addition, multiple shutter opening and closing sounds per capture may cause operator confusion.

Thus, there is a continuing need for better ways for reducing dark current noise.

SUMMARY

In accordance with one aspect, a method for reducing dark current noise in an image sensor includes measuring the forward voltage of a diode on the integrated circuit including the image sensor. An image is captured using the sensor. The forward voltage measurement is used to correct the image sensor for dark current noise.

DETAILED DESCRIPTION

Techniques to reduce the effect of dark current noise in an imaging system are described. While the following embodiments of this inventive concept are described in terms of a portable personal computer (PC) camera, they are illustrative only and are not to be considered limiting in any respect.

Figure 2:
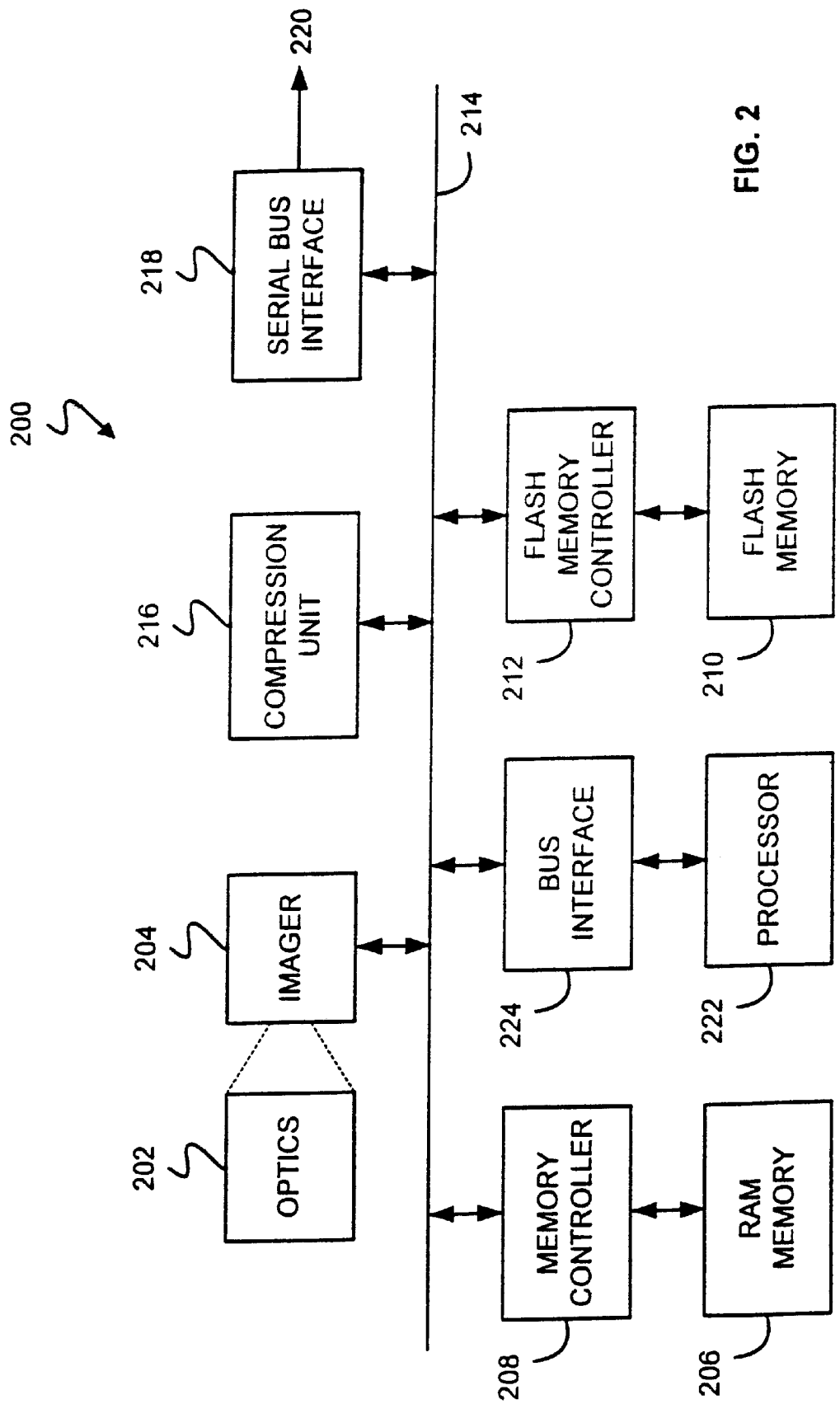
FIG. 2 shows a digital camera in accordance with one embodiment of the invention.

Referring to FIG. 2, a digital portable PC camera 200 in accordance with one embodiment of the invention may include optics unit 202 to focus an optical image onto the focal plane of imager 204. Image data (e.g., frames) generated by imager 204 may be transferred to a random access memory (RAM) 206 (through memory controller 208) or flash memory 210 (through memory controller 212) via the bus 214. In one embodiment of the invention, RAM 206 is a nonvolatile memory.

The camera 200 may also include a compression unit 216 that interacts with the imager 204 to compress the size of a generated frame before storing it in a camera memory (RAM 206 and/or flash memory 210). To transfer a frame of data to a computer, the camera 200 may include a serial bus interface 218 to couple the camera memory (RAM 206 and flash memory 210) to a serial bus 220. One illustrative serial bus is the universal serial bus (USB).

The camera 200 may also include a processor 222 coupled to a bus 214 via a bus interface unit 224. In some embodiments, the processor 222 interacts with the imager 204 to adjust image capture parameters to reduce the effect of dark current noise of the captured image or frame.

Figure 1:
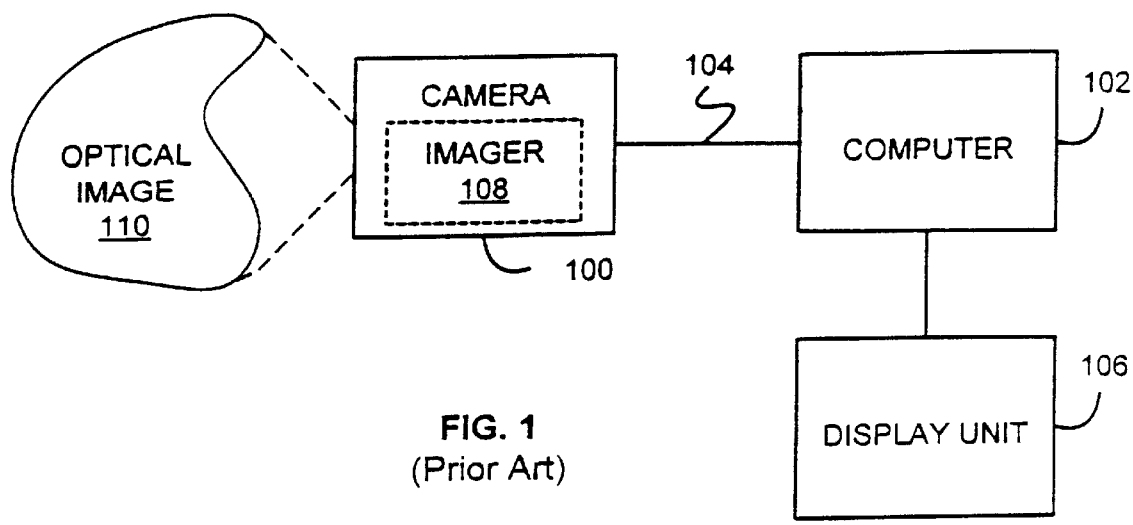
FIG. 1 shows a prior art digital imaging system.
Figure 3:
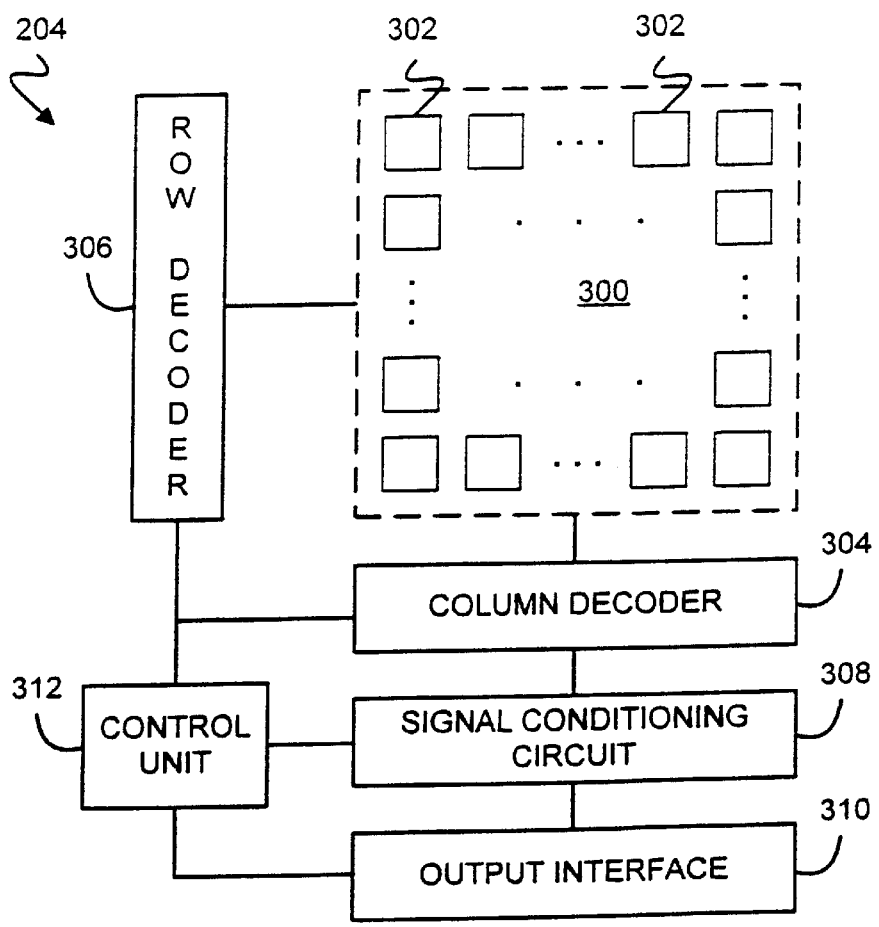
FIG. 3 shows one embodiment of the imager of FIG. 2.

Referring to FIG. 3, the imager 204 may include a rectangular grid or array 300 of pixel sensors 302. This arrangement allows column and row decoders, 304 and 306 respectively, to selectively retrieve indications from the sensors 302. In one embodiment, the sensor array 300 is a 768×576 array of complementary metal oxide semiconductor (CMOS) active pixel sensors.

Decoders 304 and 306 route the selected indications to a signal conditioning circuit 308 which may, among other functions, amplify and digitize the received signals. The signal conditioning circuit 308 may also furnish the resultant data signals to an output interface 310 which includes circuitry for interfacing the imager 204 to the bus 214. Control unit 312, through circuitry such as state machines and timers, may coordinate and control the scanning (e.g., selection by row and column decoders 306 and 308) of pixel sensor 302 indications, their subsequent processing by signal conditioning circuit 308, and their transmission to other elements of the camera 200 through an output interface 310.

Camera operations may include normal image capture and calibration. During normal image capture, each pixel sensor 302 accumulates light energy from that portion of an image that is focused on it by optics 202 for a period of time referred to as the integration time or interval. At the expiration of the integration interval, pixel sensors 302 indicate the intensity of the received light energy by, for example, an analog voltage signal. Control circuit 312 routes the pixel sensor indications through column and row decoders 304 and 306 to the signal conditioning circuit 308 where they may be amplified and digitized to form a frame—digital data signals representing the captured image. A frame may be compressed by compression unit 216 and transmitted to memory (e.g., RAM memory 206 or flash memory 210), and/or a computer system via the serial bus interface 218 and serial bus 220.

In general, during calibration camera parameters may be set. Example parameters include pixel sensor integration time, pixel sensor signal gain, and illuminant determination. Calibration may include taking measurements and making settings both in the camera manufacturing facility and during normal use of the camera.

Figure 4:
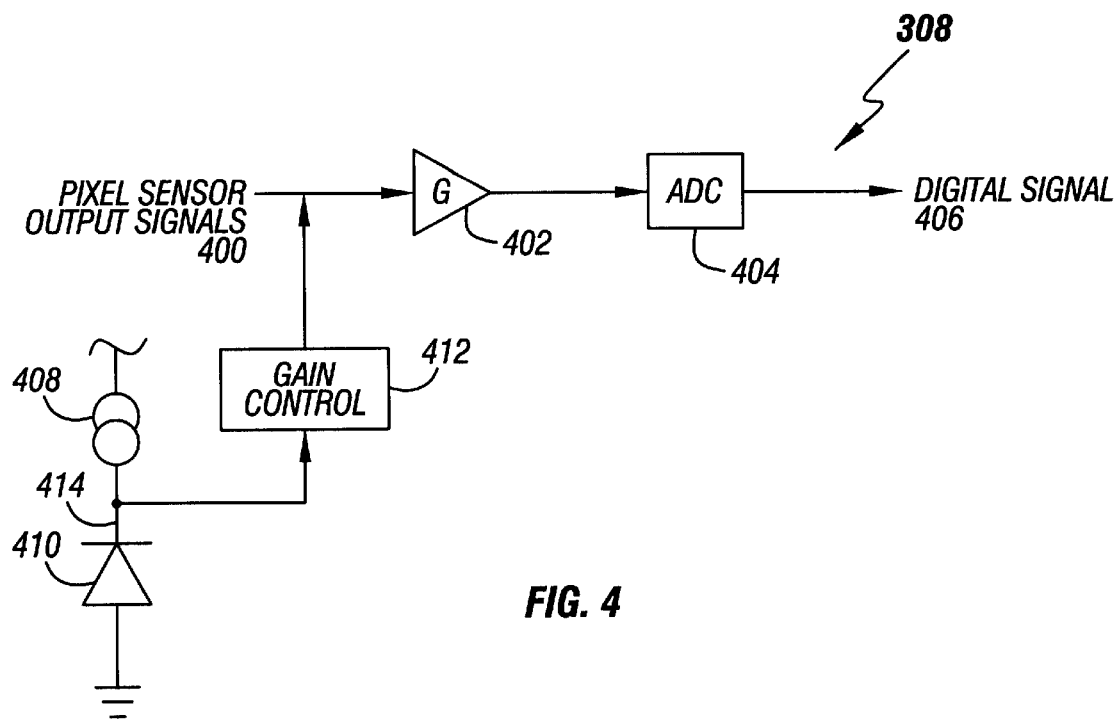
FIG. 4 shows one embodiment of the signal conditioning unit of FIG. 3.

Referring to FIG. 4, a pixel sensor output signal 400 may be amplified (by one or more gain units 402) and digitized (by one or more analog to digital converters 404) by signal conditioning circuit 308 to generate a digital signal 406. In a dark capture environment, such as during calibration, the pixel sensor output signal 400 represents pixel sensor noise (e.g., dark current noise).

In a calibration mode, a measure of the temperature of a silicon diode on the same integrated circuit as the imager 204 may be used to compensate for dark current noise. The diode 410 may be any diode which is available for use during a calibration mode. Advantageously, the diode 410 is also used for another non-calibration function. For example, an embedded flicker diode for the image sensor may be used as the diode 410 in one embodiment of the present invention. Alternatively, where a separate non-arrayed photodiode is not available, an electrostatic discharge (ESD) protection diode from an otherwise momentarily unused input or output pin of the image sensor may be utilized as the temperature sensing diode 410 for calibration.

By measuring the forward voltage of the diode 410, the image sensor junction temperature may be obtained. The voltage drop across the diode 410 varies inversely with its absolute temperature. Since dark current is a function of temperature, temperature based dark current correction information can be obtained by measuring the voltage across the diode 410.

For most image sensors the temperature is isothermal across the whole die. Therefore, even reading a temperature near an edge of the die, for example using a device pin ESD structure, can provide an accurate measure of junction temperature for the whole imaging array. The analog to digital converter 404 used to digitize the analog voltages from the sensor array may also be used during calibration to digitize the measure of the forward voltage of the diode 410.

The voltage on the node 414 may be adjusted by the gain control circuit 412 and then provided to the gain circuit 402. A current source 408 drives the diode 410.

Figure 6:
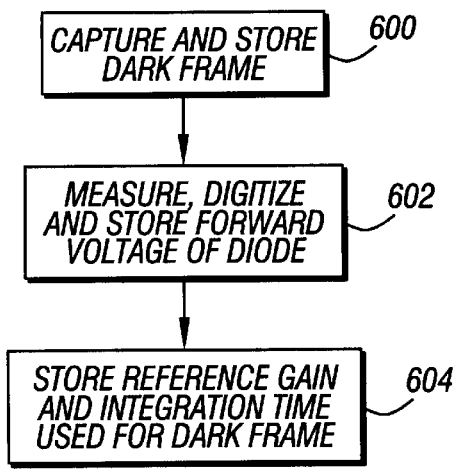
FIG. 6 is the flow for developing dark current reference information during camera assembly time.

At camera assembly time, an initial dark frame, called a reference frame, may be taken and stored in non-volatile memory such as the FLASH memory 210 as indicated at 600 in FIG. 6. At the same time, the forward voltage of the diode 410 is measured and that digitized voltage is saved in non-volatile memory (block 602). The reference gain and the reference integration time used for the dark current reference frame are also stored in the non-volatile memory, as illustrated by block 604.

Figure 7:
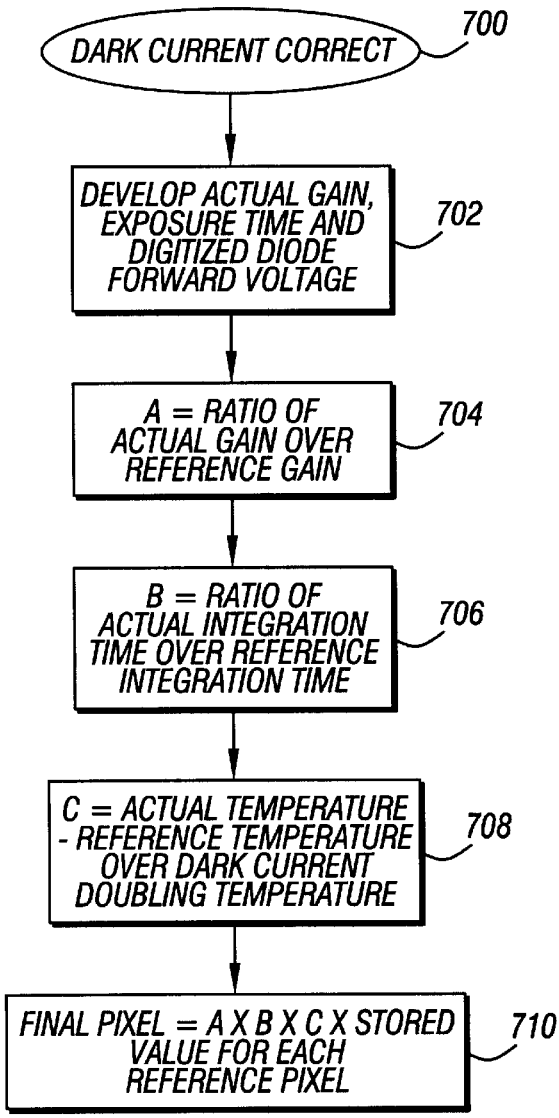
FIG. 7 is a flow chart for software for making a dark current correction at image capture time.

Referring to FIG. 7, a software routine 700 may control the calibration sequence. Whenever the camera is utilized to capture an image, metering determines what gain and exposure time should be used for the actual scene frame. Those parameters along with a new measure of the digitized forward voltage of the reference diode 410 form the scalars for synthesizing a dark frame (block 702).

To synthesize a dark frame that matches the scene frame conditions, each pixel of the reference dark frame may be multiplied by a correction factor. The correction factor may be equal to the product of the values A, B and C. A is the ratio of the actual scene gain to the reference gain, as indicated in block 704. B is the ratio of the scene capture and reference integration times (block 706). C is the difference between actual forward voltage measured at scene capture time and the reference forward diode voltage, then converted to temperature, and finally divided by the dark current doubling temperature of the process used to make the image sensor (block 708). Each final pixel value is determined by multiplying A, B and C times the stored reference pixel value (block 710).

Figure 5:
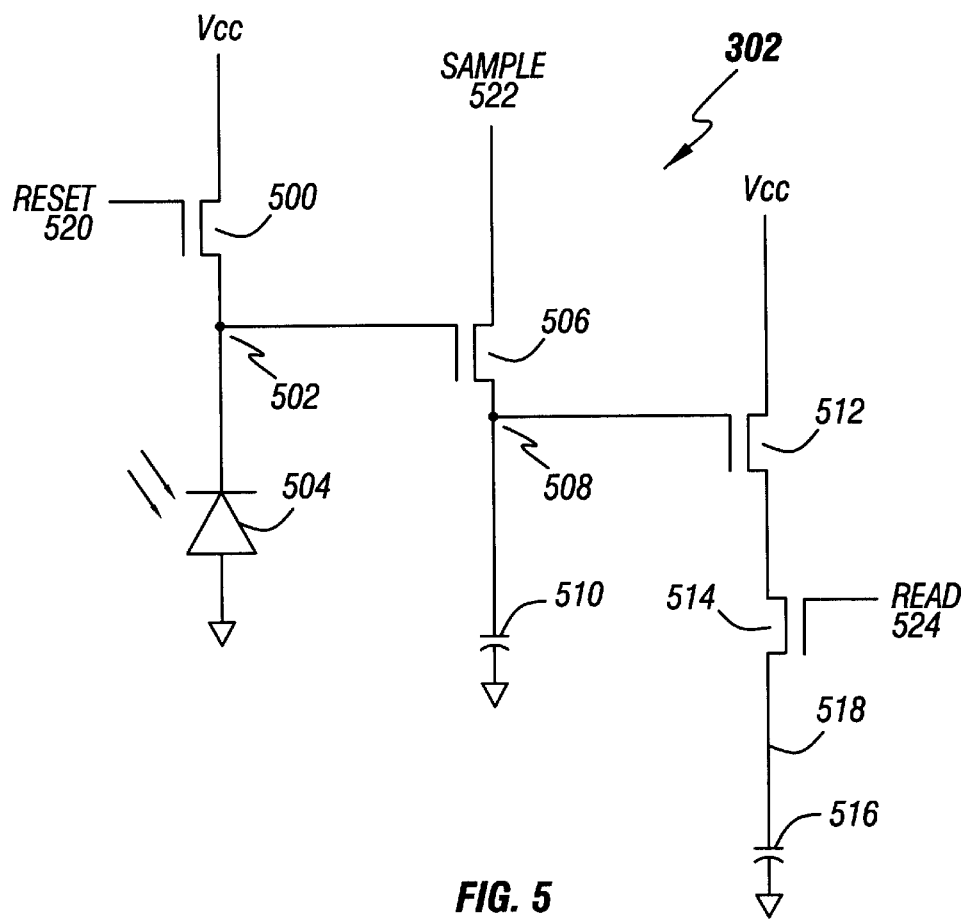
FIG. 5 shows a schematic of an active pixel sensor in accordance with one embodiment of the invention.

Referring to FIG. 5, the pixel sensor 302 may include a transistor 500, a sample node 502, a photosensitive element such as photodiode 504, a transistor 506, a storage node 508, a storage capacitor 510, transistors 512 and 514, output capacitor 516, and an output node 518. Signals RESET 520, SAMPLE 522, and READ 524 control the operation of sensor element 302 and may be generated by control unit 312 as a result of its own operation or at the bequest of, for example, the processor 222. Transistors 500, 506, 512, and 514 may, in one embodiment, be n-channel CMOS field effect transistors. The voltage Vcc may be a positive supply voltage such as, for example, 3.3 volts.

Prior to capturing an image, sample node 502 may be initialized with a positive initialization voltage (Vcc) by briefly asserting (driving high, for example) RESET signal 520. After a specified time, RESET signal 520 is deasserted (driven low, for example) and SAMPLE signal 522 is asserted to initiate pixel sensor 302 integration. Asserting SAMPLE signal 522 activates transistor 506, selectively coupling sample node 502 to storage node 508, allowing storage capacitor 510 to accumulate charge from sample node 502.

During normal capture operations, part of the accumulated charge may represent sensor noise (e.g., dark current), and part of the accumulated charge may represent the image being captured. During dark image capture operations in the calibration phase, the accumulated charge typically represents sensor noise.

To transfer the analog voltage at the storage node 508 (following deassertion of SAMPLE signal 522) to the output node 518, the transistor 514 may be activated by READ signal 524 (READ signal 524 may be generated by row decoder 306). Because the transistor 512 is arranged in a common source configuration, the voltage signal at storage node 508 is coupled to output node 518 when READ signal 524 is asserted (i.e., when transistor 514 is activated).

In some embodiments of the present invention, an accurate dark frame may be created at image taking time without having to actually run a full frame exposure in the dark condition. This may save valuable click to capture time, thus allowing faster back-to-back captures. Also the number of shutter opening and closing cycles may be reduced, thereby saving battery power. By having only one shutter opening and closing for capture, there is less chance of confusing the user with multiple clicks or multiple shutter cycles.

Various changes in the materials, components, circuit elements, as well as in the details of the illustrated operational method are possible without departing from the scope of the claims. For instance, elements of the illustrative camera of FIG. 2 may be embodied in discrete logic elements, or combined into one or more application specific integrated circuits (ASIC). Further, the invention is not limited to portable PC cameras, but may be used in any digital imaging system. Storage devices suitable for tangibly embodying program instructions include all forms of non-volatile memory including, but not limited to: semiconductor memory devices such as non-volatile RAM (e.g., memory 206), EPROM, EEPROM, and flash devices (e.g., memory 210); magnetic disks (fixed, floppy, and removable); other magnetic media such as tape; and optical media such as CD-ROM disks.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for reducing dark current noise of an image sensor comprising:

measuring the forward voltage of a silicon diode on an integrated circuit including said image sensor;

capturing an image using said sensor;

using said measured voltage to correct the captured image for dark current noise; and capturing and storing a dark frame at a first time and measuring and storing a measure of the forward voltage of the diode at said first time.

2. The method of claim 1 further including compensating for dark current noise without requiring a separate shutter cycle.

3. The method of claim 1 further including converting an indication of said image in a first analog to digital converter.

4. The method of claim 3 further including converting said measured voltage to a digital voltage using said first analog to digital converter.

5. The method of claim 1 further including capturing and storing a dark frame at a first time.

6. The method of claim 5 including, digitizing the measure of the forward voltage of the diode at said first time.

7. The method of claim 6 further including storing a gain and an integration time used for the capture of said dark frame at said first time.

8. The method of claim 7 wherein using said measured voltage to correct the captured image for dark current noise includes developing a correction factor that is a function of the difference between the temperature at said first time and the temperature at a second time closer to the time when said image was captured.

9. The method of claim 8 wherein using said measured voltage to correct the captured image for dark current noise includes developing the gain, integration time and diode forward voltage at said second time and developing a scalar to account for the differences in conditions at said first and second times.

10. The method of claim 9 further including determining the ratio of the gain at said second time over the gain at said first time.

11. The method of claim 10 further including determining the ratio of the integration time at said second time over the integration time at said first time.

12. The method of claim 11 further including determining the difference between the temperature at said second time and the temperature at said first time and dividing said difference by the dark current doubling temperature for the image sensor.

13. The method of claim 12 further including multiplying said ratios by a stored value for each pixel at said first time.

14. An article comprising a medium for storing instructions that, if executed, enable a processor-based system to:

measure the forward voltage of a silicon diode on an integrated circuit including said image sensor;

capture and storing a dark frame at a first time;

measure and store the forward voltage of the diode at said first time;

capture an image using said sensor; and use said measured voltage to correct the captured image for dark current noise.

15. The article of claim 14 further storing instructions that cause a processor-based system to develop a correction factor which is a function of the difference between a first temperature and a second temperature closer than said first time to the time when the image was captured by the image sensor.

16. The article of claim 15 further storing instructions that cause a processor-based system to develop the gain, integration time and diode forward voltage at said second time and to develop a scalar which may be multiplied by a stored value taken at the first time to account for the differences in conditions at said first and second times.

17. The article of claim 16 further storing instructions that cause a processor-based system to determine the ratio of the gain at said second time over the gain of said first time.

18. The article of claim 17 further storing instructions that cause a processor-based system to determine the ratio of the integration time at said second time over the integration time at said first time.

19. The article of claim 18 further storing instructions that cause a processor-based system to determine the difference between the temperature at said second time and the temperature at said first time and to divide said difference by the dark current doubling temperature for the image sensor.

20. The article of claim 19 further storing instructions that cause a processor-based system to multiply the ratios by a stored value for each pixel at the first time.

21. A camera comprising:

a substrate having an imager and a silicon diode formed thereon;

a circuit to measure the forward voltage of said diode; and a device to automatically correct the imager for dark current noise using the measured forward voltage of said diode and store information about the forward voltage of said diode at a first time when a referenced dark current is captured.

22. The camera of claim 21 wherein said camera is adapted to compensate for dark current noise without requiring a separate shutter cycle.

23. The camera of claim 21 including an analog to digital converter adapted to convert a signal relating to an image captured by said imager into a digital signal.

24. The camera of claim 23 wherein said analog to digital converter is also coupled to convert said forward voltage of said diode.

25. The camera of claim 21 wherein said memory also stores information about the gain and integration time used to capture the reference dark current frame at said first time.

26. The camera of claim 21 including memory storing an algorithm which corrects for dark current noise using the difference in temperature between the temperature at a first time and the temperature at a second time when an image, needing the dark current connection, is captured.

27. The camera of claim 26 wherein said algorithm uses information about the gain and integration time at said first and second times.

28. A camera comprising:

an imager;

a circuit to measure the temperature of said imager;

a device to automatically correct the imager for dark current noise using the measured temperature; and a memory storing an algorithm to correct for dark current noise using the difference in temperature between the temperature at a first time and a temperature at a second time when an image, needing dark current correction, is captured, wherein said algorithm uses information about the gain and integration time at said first and second times.

29. The camera of claim 21 wherein said device to measure temperature includes a silicon diode formed on a substrate with said imager.

30. The camera of claim 28 wherein said camera is adapted to compensate for dark current noise without requiring a separate shutter cycle.

* * * * *